United States Patent [19]

Hammond

[11] Patent Number: 5,619,407
[45] Date of Patent: Apr. 8, 1997

[54] AUTOTRANSFORMER

[75] Inventor: Peter W. Hammond, Greensburg, Pa.

[73] Assignee: Robicon Corporation, New Kensington, Pa.

[21] Appl. No.: 597,169

[22] Filed: Feb. 6, 1996

[51] Int. Cl.⁶ .................................................. H02M 5/02
[52] U.S. Cl. ........................................ 363/155; 363/148
[58] Field of Search ................................. 363/148, 153, 363/154, 155, 156

[56] References Cited

U.S. PATENT DOCUMENTS

| | | | |
|---|---|---|---|
| 2,307,527 | 1/1943 | Maslin et al. | 363/154 |
| 2,714,700 | 8/1955 | Johnson | 363/155 |
| 3,711,762 | 1/1973 | Eckenfelder et al. | 363/154 |
| 4,779,181 | 10/1988 | Traver et al. | 363/154 |
| 5,124,904 | 6/1992 | Paice . | |

FOREIGN PATENT DOCUMENTS 748728  7/1980  Russian Federation .

OTHER PUBLICATIONS

"Power Electronic Converter Harmonics" by Derek A. Paice, published by Paice & Associates, 1994, pp. 42–43, 70–73, 98–99, 206–209.

Primary Examiner—Peter S. Wong
Assistant Examiner—Y. J. Han
Attorney, Agent, or Firm—Buchanan Ingersoll, P.C.

[57] ABSTRACT

The invention provides for an autotransformer for converting three-phase AC power to nine-phase AC power. The autotransformer includes three coils each having a plurality of serial windings and a plurality of stub windings. The serial windings form a delta and the stub windings are magnetically coupled with the serial windings from the same coil. Three terminals are provided at the apices of the delta and the three-phase AC source may be directly connected to the respective apex terminals. A plurality of direct outputs are interposed between respective serial windings and a plurality of indirect outputs are electrically connected with the second ends of the stub windings. The voltage magnitude of each of the direct outputs is preferably equal to the voltage magnitude of each of the indirect outputs. The voltages of the direct outputs and indirect outputs are out of phase with the voltages at the apex terminals.

12 Claims, 5 Drawing Sheets

AUTOTRANSFORMER

BACKGROUND OF THE INVENTION

1. Field of the Invention

The present invention relates to autotransformers for converting three-phase power to nine-phase power, and more particularly to autotransformers for providing reduced harmonics and ripple in an AC to DC rectifier.

2. Description of the Related Art

It is well known in AC to DC rectification that AC current harmonics and DC ripple may be improved by increasing the number of AC phases employed. For rectifiers that produce two outpost pulses per cycle per phase (such as a full-wave bridge), it is also well known that the number of phases of AC input should be odd.

Large rectifier equipment are often restricted in the AC harmonics which they may produce. These regulations may be satisfied by using an 18-pulse rectifier which requires a nine-phase source of AC power. There is therefore a need for a device to convert three-phase power to nine-phase power inasmuch as the global standard for the distribution of AC power is three-phase.

Such a device for converting three-phase AC power to nine-phase AC power is taught in U.S.S.R. Patent No. 748,728. This patent discloses an isolation transformer for producing nine-phase AC power. However, the isolation transformer must be rated for the full power required.

Figure 1:
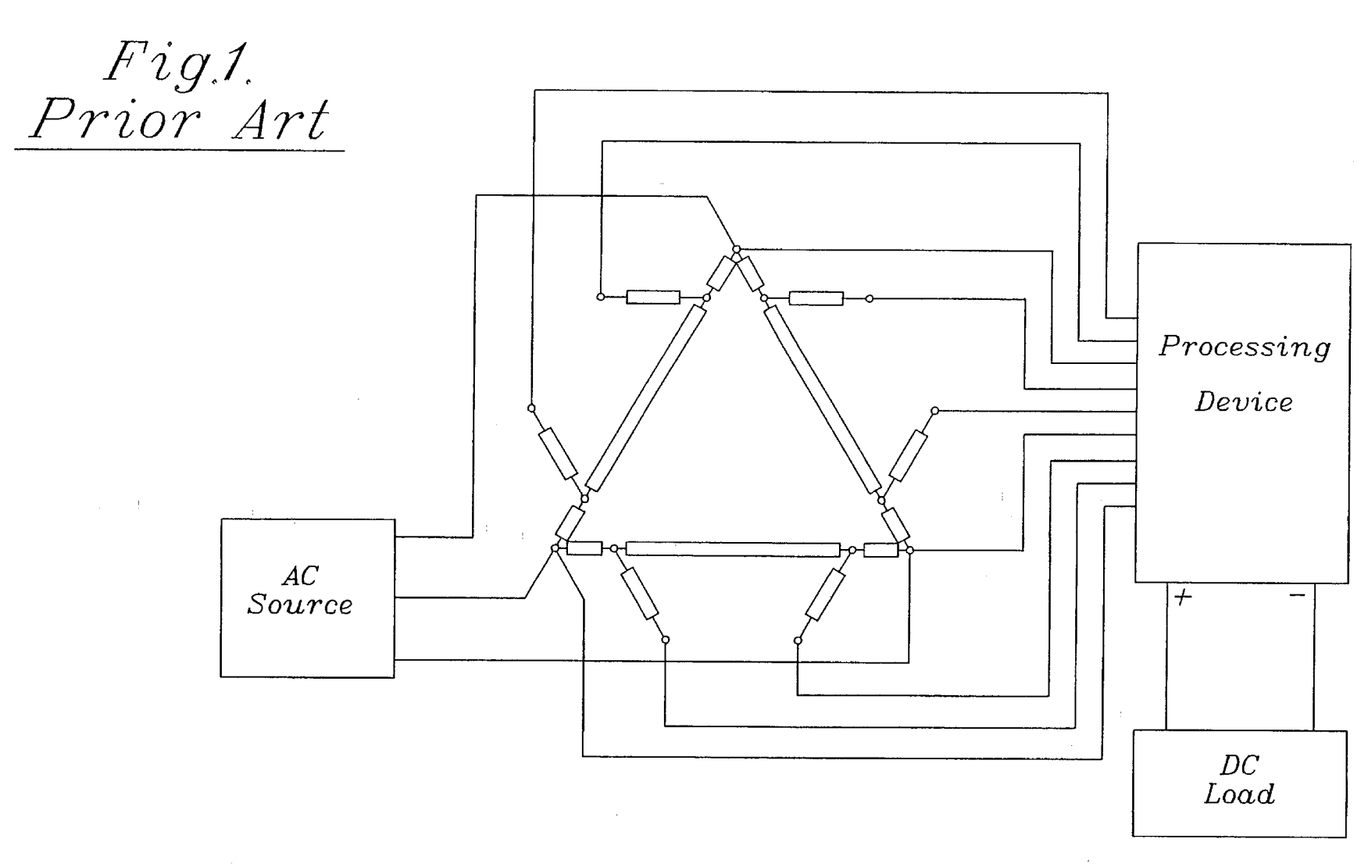
FIG. 1 is a connection diagram of a first prior art autotransformer.

In addition, the size and weight of the device may be reduced if isolation from the distribution system is not required. In particular, the device may be an autotransformer as taught in U.S. Pat. No. 5,124,904 and shown in FIG. 1. The autotransformer passes the three input phases directly through to become three of the output phases of the autotransformer. The autotransformer generates six additional output phases to achieve a total of nine output phases.

Passing the input phases directly to the output forces the output nine-phase power to have the same line-to-neutral voltage magnitude as the input three-phase AC power. When the nine-phase AC voltage from the autotransformer shown in FIG. 1 feeds an 18-pulse rectifier, the DC output voltage is about 14% higher than would result from the original three-phase AC input power feeding a 6-pulse rectifier.

It is desirable to reduce the magnitude of the nine-phase AC voltage to compensate for this 14% increase in DC voltage. The magnitude of the voltage should be reduced for use within existing systems that previously utilized 6-pulse rectifiers so that the DC voltage remains unchanged.

Figure 2:
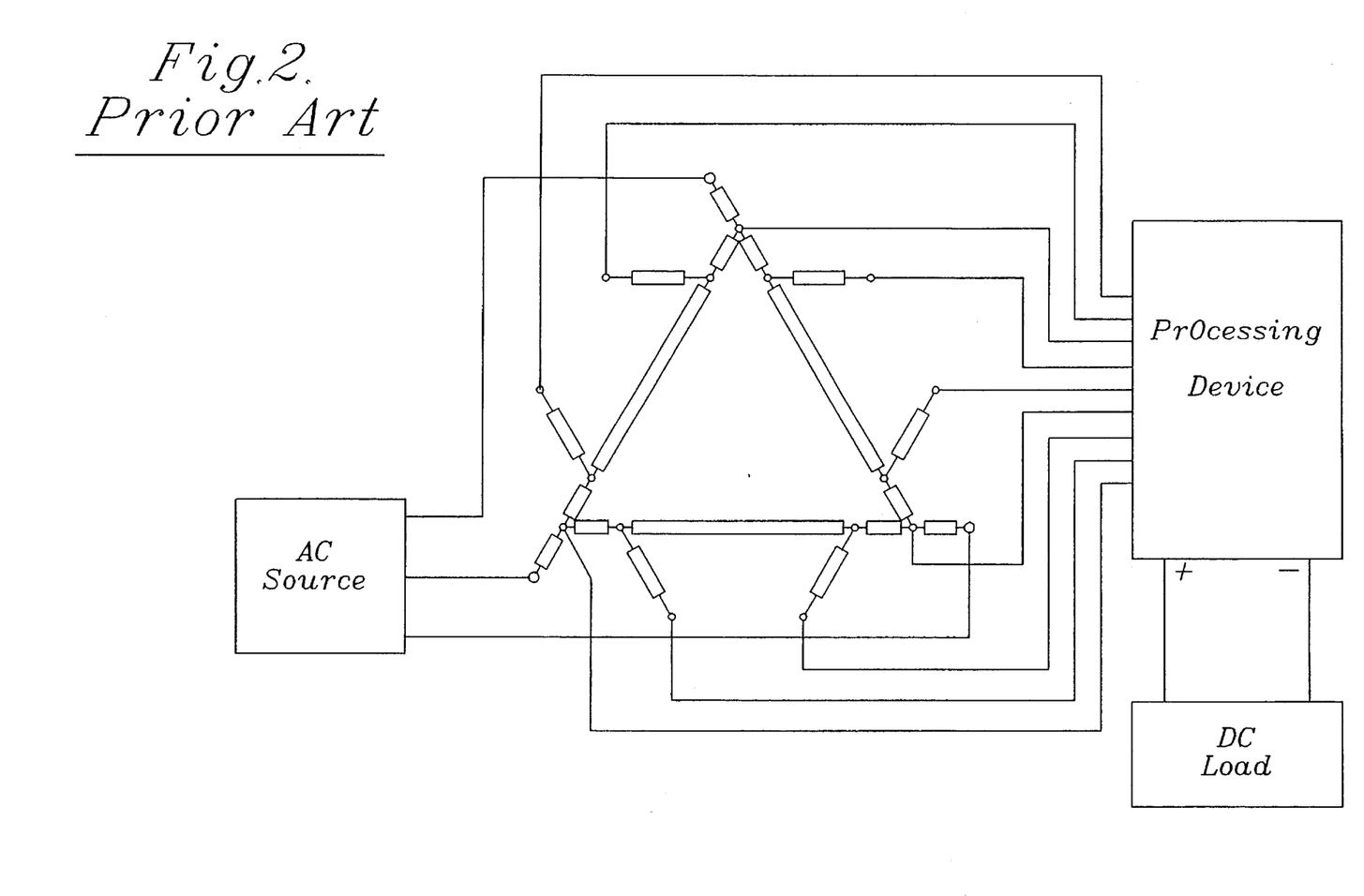
FIG. 2 is a connection diagram of a second prior art autotransformer which reduces the magnitude of the voltage on the DC side.

U.S. Pat. No. 5,124,904 also teaches the device shown in FIG. 2. This device includes an additional winding between each AC line and the associated delta apex to decrease the voltage on the DC side. However, such a design requires additional material for a given capacity and results in larger values of leakage reactance.

Therefore, there is a need for an improved autotransformer that converts three-phase power to nine-phase power while reducing the voltage magnitude by 14% without decreasing transformer material utilization.

SUMMARY OF THE INVENTION

The invention provides for an autotransformer for converting three-phase AC power to nine-phase AC power. The autotransformer includes three coils each having a plurality of serial windings and a plurality of stub windings. The serial windings form a delta and the stub windings are magnetically coupled with serial windings from the same coil. The stub windings are additionally electrically connected at a first end thereof with respective ones of the serial windings.

Three terminals are provided at the apices of the delta. The three-phase AC source is preferably directly connected to the respective apex terminals.

A plurality of direct outputs are interposed between respective serial windings and a plurality of indirect outputs are electrically connected with the second ends of the stub windings.

The voltage of each of the direct outputs is out of phase with the voltage of a corresponding one of the apex terminals by a given phase angle such as 5°. The voltage of the indirect outputs is preferably either 35° or 45° out of phase with the voltage of a corresponding one of the apex terminals. Further, the voltage of the indirect outputs is preferably either 40° leading or lagging one of the direct outputs.

In addition, the line-to-neutral voltage magnitude of each of the direct outputs is preferably equal to the line-to-neutral voltage magnitude of each of the indirect outputs.

A complete understanding of the invention will be obtained from the following description and the accompanying figures.

DETAILED DESCRIPTION OF THE PREFERRED EMBODIMENTS

Figure 3:
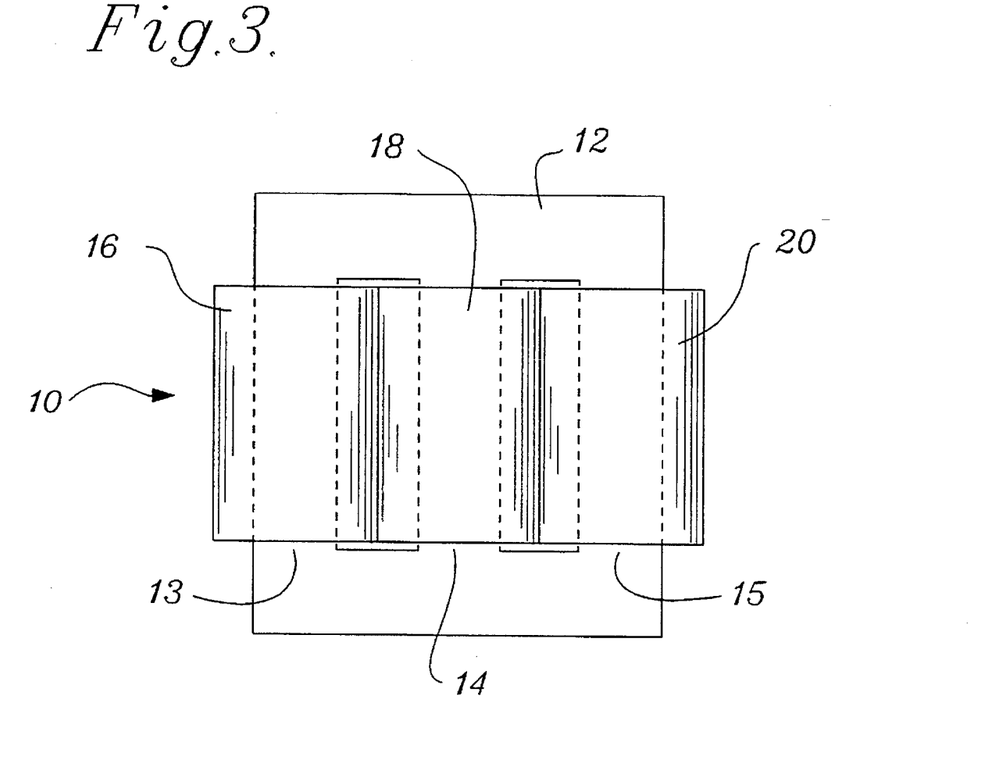
FIG. 3 is a front view of the core and coils of an autotransformer in accordance with the present invention.
Figure 4:
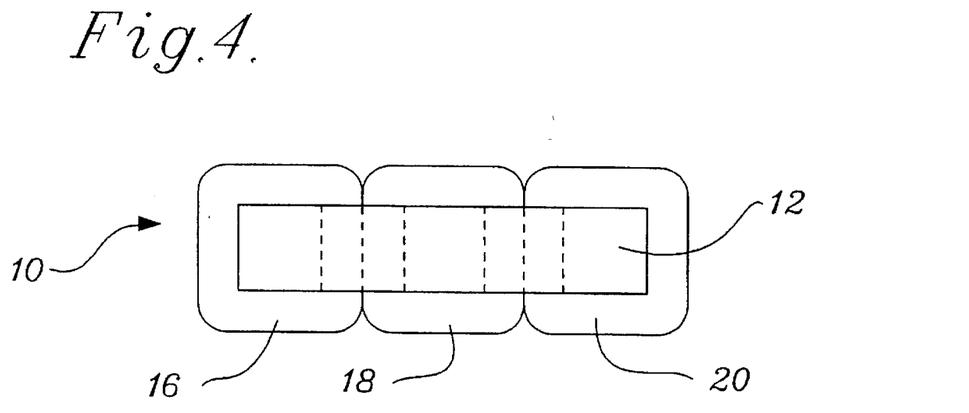
FIG. 4 is a plan view of the core and coils of the autotransformer shown in FIG. 3.

Referring to FIGS. 3–4, the autotransformer 10 in accordance with the present invention can be constructed on a laminated core 12 of electrical grade steel such as M-6 provided by Armco Incorporated of Middletown, Ohio. The laminated core 12 may have three equal paths or legs 13, 14, 15 for magnetic flux. The core 12 preferably has no other magnetic flux paths than the three legs 13, 14, 15 such that the flux flowing down through one leg (e.g., leg 14) must return upwards through another leg (e.g., leg 13 or 15).

Each leg 13, 14, 15 passes through a coil 16, 18, 20 which contains a plurality of windings. For example, the first coil 16 may include windings 22a–22f, the second coil 18 may contain windings 24a–24f, and the third coil 20 may contain windings 26a–26f as shown in FIG. 5.

Each winding 22a–f in coil 16 on leg 13 of the core 12 will experience the same induced volts per turn from the flux within leg 13. The same will be true for windings 24a–f in coil 18 on leg 14 and for windings 26a–f in coil 20 on leg 15. Therefore, each winding 22a–f, 24a–f, 26a–f on the same respective leg 13, 14, 15 will be in phase with one another.

Each winding 22a–f, 24a–f, 26a–f has the same polarity provided that the direction of each winding 22a–f, 24a–f, 26a–f is consistent. For example, assume the right end of each winding 22a–f shown in FIG. 5 is the start end. Then the end of winding 22f joining tap 38b and the end of winding 22e joining indirect output 50b are both start ends. Similarly, the end of winding 24a joining direct output 38a and the end of winding 26a joining direct output 40a are both start ends.

Figure 5:
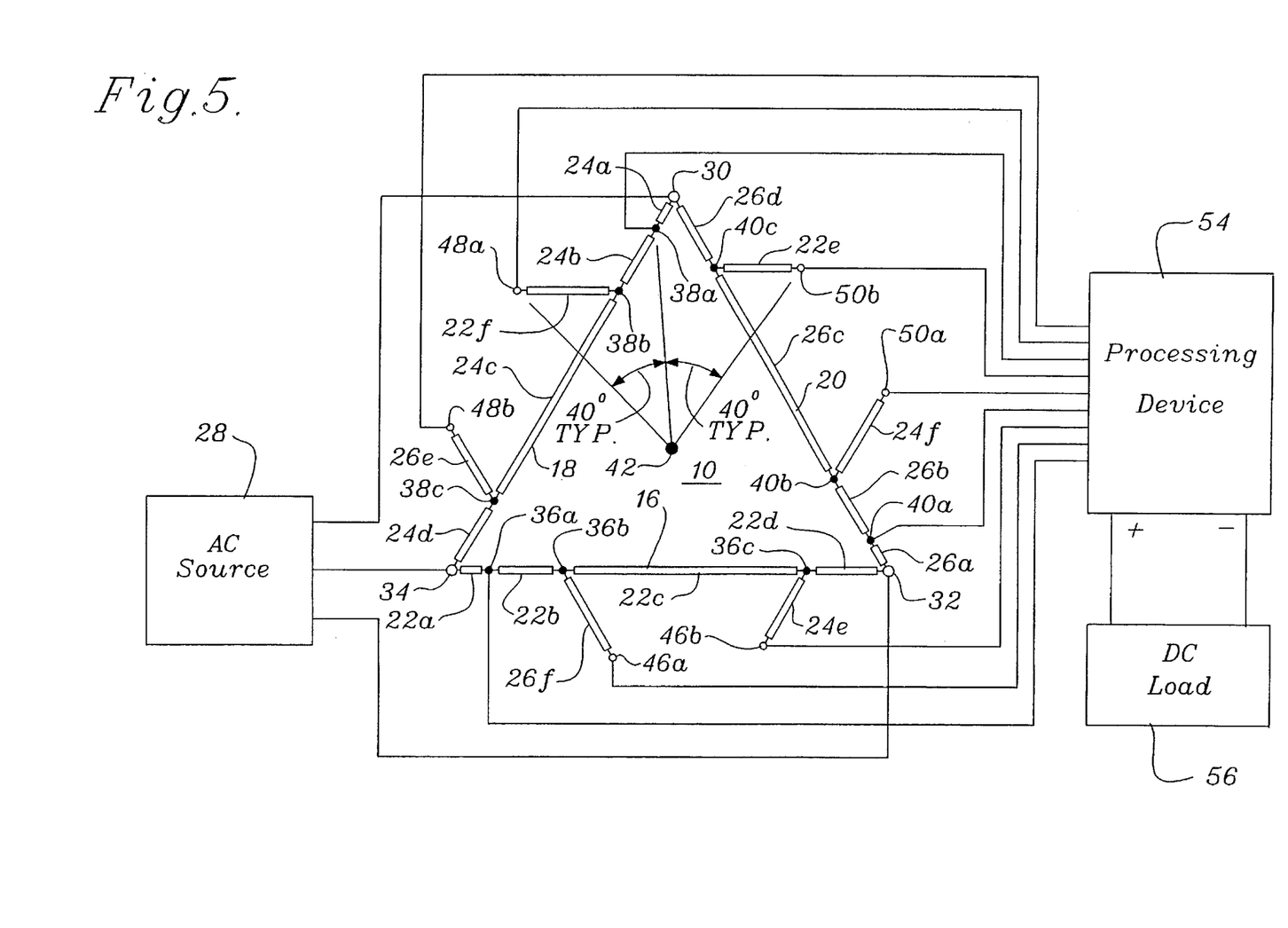
FIG. 5 is a connection diagram of an autotransformer in accordance with the present invention.

The input three-phase voltage from a three-phase AC source 28 is connected to a plurality of apices or terminals 30, 32, 34 as shown in FIG. 5. Each of the apex terminals 30, 32, 34 is connected to respective windings of coils 16, 18, 20.

Four of the windings 22a–d, 24a–d, 26a–d within each coil 16, 18, 20 are serially connected and will be referred to as serial windings. The remaining windings 22e–f, 24e–f, 26e–f will be referred to as stub windings. The extreme ends of the series connections are coupled with respective ones of the apex terminals 30, 32, 34.

The first apex terminal 30 and second apex terminal 32 may be connected to opposite ends of the four serial windings 26a–d of the third coil 20. The second terminal 32 and third terminal 34 may be connected to opposite ends of the four serial windings 22a–22d of the first coil 16. The third terminal 34 and first terminal 30 may be connected to opposite ends of the four serial windings 24a–24d of the second coil 18.

In addition, the first terminal 30 is connected to the finish end of the first serial winding 24a within the second coil 18. The start end of the first serial winding 24a is connected to the finish end of the second serial winding 24b within the second coil 18. The start end of the second serial winding 24b is connected to the finish end of third serial winding 24c. The start end of the third serial winding 24c is connected to the finish end of the fourth serial winding 24d within the second coil 18. The start end of the fourth serial winding 24d is connected to the third apex terminal 34.

Further, serial windings 22a–22d of the first coil 16 may be connected in series between the second terminal 32 and the third terminal 34, and serial windings 26a–26d of the third coil 20 may be connected in series between the first terminal 30 and the second terminal 32. Any transposition of the legs 13, 14, 15 or coils 16, 18, 20 will not affect the characteristics of the autotransformer 10 inasmuch as the three core legs 13, 14, 15 and coils 16, 18, 20 are preferably equivalent. Also, the characteristics of the autotransformer 10 are not affected if the start ends and finish ends of all windings 22a–f, 24a–f, 26a–f are reversed.

Referring again to FIG. 5, each of the coils 16, 18, 20 additionally includes a plurality of respective taps 36a–c, 38a–c, 40a–c intermediate the respective serial windings 22a–d, 24a–d, 26a–d. The taps 36a–c, 38a–c, 40a–c within each coil 16, 18, 20 are connection points for nine outputs. In particular, taps 36a, 38a, 40a may be utilized as direct taps or direct outputs, while taps 36b–c, 38b–c, 40b–c are connected to respective ones of the stub windings 22e–f, 24e–f, 26e–f to form indirect outputs 46a–b, 48a–b, 50a–b.

For an input phase sequence such that the voltages at the direct outputs 36a, 38a, 40a lag the voltages at the terminals 30, 32, 34, then the stub windings 22e, 24e, 26e form lead indirect outputs 46b, 48b, 50b while stub windings 22f, 24f, 26f form lag indirect outputs 46a, 48a, 50a. However, it is to be understood that stub windings 22e, 24e, 26e may form lag indirect outputs 46b, 48b, 50b and stub windings 22f, 24f, 26f may form lead indirect outputs 46a, 48a, 50a and that the voltages at the direct outputs 36a, 38a, 40a may lead the voltages at the apex terminals 30, 32, 34 for the other possible input phase sequence.

Preferably, the number of turns in windings 22a, 24a, 26a are chosen such that the voltage magnitude from the direct output taps 36a, 38a, 40a to neutral is 14% less than the voltage magnitude from the terminals 30, 32, 34 to neutral.

It should be noted that the neutral point does not physically exist within the autotransformer 10 but may exist within the AC source 28. The neutral point is simply a reference point from which the three voltages measured to terminals 30, 32, 34 will sum to zero. The voltages measured to the direct output taps 36a, 38a, 40a from the neutral point will also sum to zero. Since the neutral point may not exist physically, a virtual neutral point 42 is identified in FIG. 5 and FIG. 6.

Figure 6:
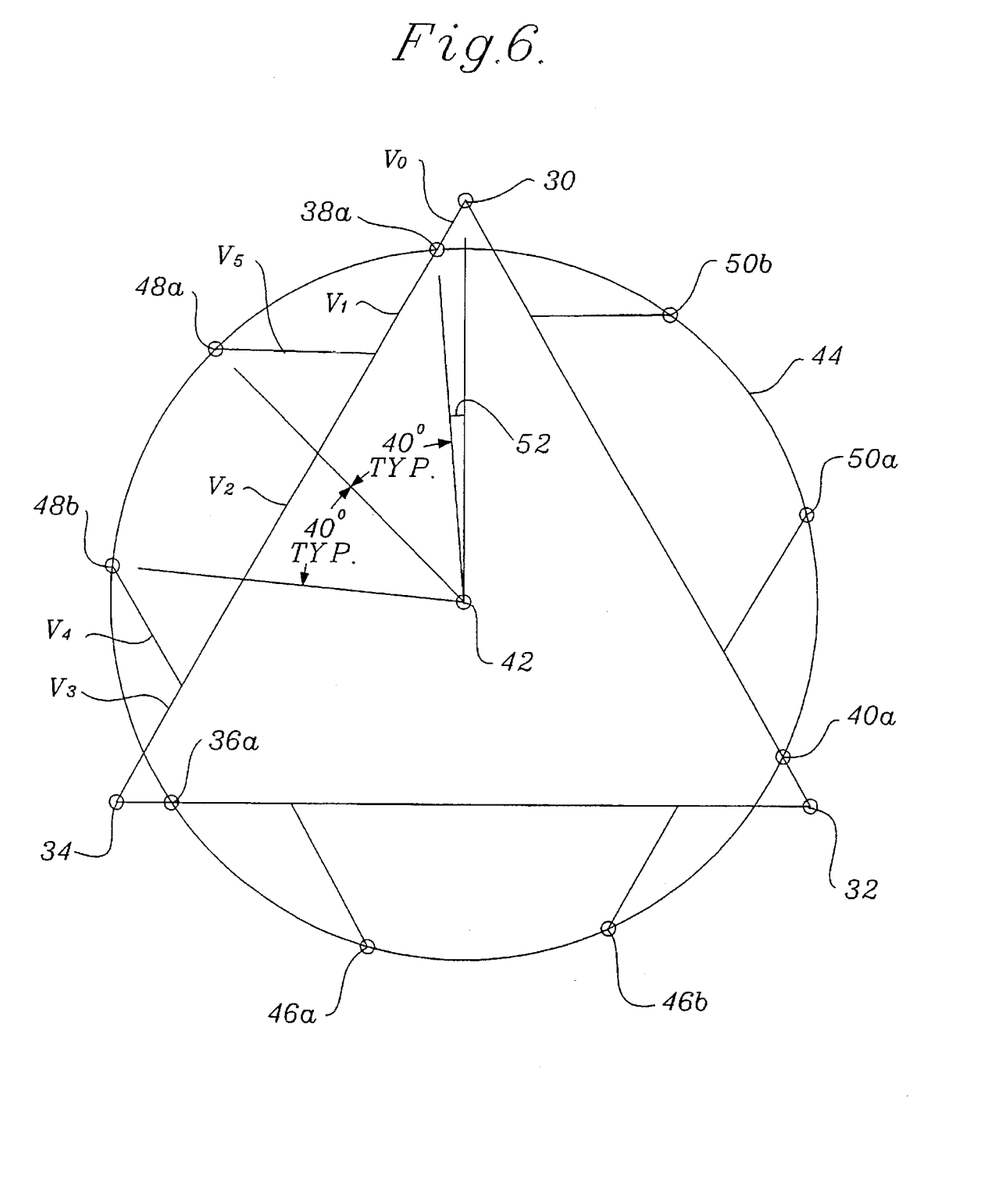
FIG. 6 is a geometrical representation of the windings of the autotransformer shown in FIG. 5.

As shown in the geometric representation of the windings 22e–f, 24e–f, 26e–f in FIG. 6, the three voltages on the direct output taps 36a, 38a, 40a form a balanced three-phase set with less magnitude than the input voltages on the terminals 30, 32, 34. There is a relatively small phase angle 52, ALPHA, by which the voltages at the direct output taps 36a, 38a, 40a may lead or lag the voltages at the terminals 30, 32, 34, respectively. The phase angle 52 should be within the range of generally 4° to 6° and is preferably 5° to achieve the desired 14% reduction in voltage magnitude.

To complete the desired nine-phase set, it is necessary to provide six additional voltages. These voltages preferably have the same magnitude as the voltages at the direct outputs 36a, 38a, 40a and therefore the vector of each of the voltages lies on a circle 44 centered on the virtual neutral point 42 and passing through the direct output taps 36a, 38a, 40a as shown in FIG. 6. The six additional voltages are provided at indirect outputs 46a–b, 48a–b, 50a–b. The nine-phase voltages from the direct outputs 36a, 38a, 40a and indirect outputs 46a–b, 48a–b, 50a–b are evenly spaced around the circle 44 at 40° intervals as shown in FIG. 6.

The six additional voltages are supplied as three pairs and each pair is associated with one of the direct outputs 36a, 38a, 40a. The additional voltages are located to respectively lead and lag the corresponding voltages at the direct outputs 36a, 38a, 40a by 40°.

Referring to FIG. 6, the voltage at indirect output 48a is generally 40+ALPHA (phase angle 52) degrees out of phase (approximately 45°) with the voltage at terminal 30. The voltage at indirect output 50b is generally 40–ALPHA (angle 52) degrees out of phase (approximately 35°) with the voltage at terminal 30.

The voltage at indirect output 46a is created by the voltage at tap 36b on the first coil 16 supplemented by a voltage produced by an stub winding 26f of the third coil 20. The voltage at indirect output 46b is created by the voltage at tap 36c supplemented by a voltage produced by stub winding 24e of the second coil 18. The voltage at indirect output 48a is created by the voltage at tap 38b on the second coil 18 supplemented by a voltage produced by stub winding 22f of the first coil 16. The voltage at indirect output 49b is created by the voltage at tap 38c supplemented by the voltage produced by stub winding 26e of the third coil 20. The voltage at indirect output 50a is created by the voltage at tap 40b on the third coil 20 supplemented by the voltage produced by stub winding 24f of the second coil 18. The voltage at indirect output 50b is created by the voltage at tap 40c supplemented by a voltage produced by stub winding 22e of the first coil 16.

The number of turns within all windings 22a–f, 24a–f, 26a–f is chosen so that the indirect outputs 46a–b, 48a–b, 50a–b lie on the circle 44 and therefore have the same voltage magnitude as the voltages at the direct outputs 36a, 38a, 40a.

In addition, the number of turns may be chosen such that the voltages at the indirect outputs 46a, 48a, 50a lead or lag the respective voltages at the direct outputs 36a, 38a, 40a by 40°. Further, the number of turns may be chosen such that the voltages at indirect outputs 46b, 48b, 50b lag or lead the respective voltages at the direct outputs 36a, 38a, 40a by 40°.

Referring again to FIG. 5, the direct outputs 36a, 38a, 40a and the indirect outputs 46a–b, 48a–b, 50a–b are connected to a downstream power processing device 54 such as a AC-DC converter and the like. Through the utilization of an autotransformer 10 in accordance with the present invention to provide a nine-phase input AC signal to an 18-pulse AC-DC solid state converter 54, the AC harmonics are reduced and a smooth output is provided to the DC load 56.

The number of turns in each serial winding and stub winding 22a–f, 24a–f, 26a–f must be an integer in any real transformer 10. A computer may be utilized to efficiently determine a suitable number of turns for each winding 22a–f, 24a–f, 26a–f that satisfies the geometry of FIG. 6.

FIG. 6 shows the apex terminals 30, 32, 34, direct outputs 36a, 38a, 40a and indirect outputs 46, 48, 50. The triangle defined by the apex terminals 30, 32, 34 is equilateral and all internal angles are therefore 60°. The following equations are developed from the geometry shown in FIG. 6 and the equations may be solved to determine the appropriate number of turns for each serial winding and stub winding 22a–f, 24a–f, 26a–f. The variables within the set of equations are as follows:

$V_{OUT}$=the desired line-to-neutral output voltage
$V_{IN}$=the provided line-to-neutral input voltage
$V_0$=the voltage produced by windings 22a, 24a, 26a
$V_1$=the voltage produced by windings 22b, 24b, 26b
$V_2$=the voltage produced by windings 22c, 24c, 26c
$V_3$=the voltage produced by windings 22d, 24d, 26d
$V_4$=the voltage produced by windings 22e, 24e, 26e
$V_5$=the voltage produced by windings 22f, 24f, 26f
Angle 52 (Alpha)=the angle by which the direct outputs 22a, 24a, 26a lead or lag the apex terminals 30, 32, 34

The desired line-to-neutral voltage output voltage and the provided line-to-neutral input voltage are related by:

$$V_{IN}=V_{OUT}*\text{SIN(ALPHA)}/\text{TAN}(30°)+V_{OUT}*\text{COS(ALPHA)} \quad \text{Eq. 1}$$

Thus, for any choice of an input line-to-neutral voltage and phase angle 52 (i.e., ALPHA), the output voltage may be determined. By applying further geometry to FIG. 6 the following relationships are expressed:

$$V_0*\text{SIN}(30°)=V_{OUT}*\text{SIN(ALPHA)} \quad \text{Eq. 2}$$

$$(V_0+V_1)*\text{COS}(30)=V_{IN}-V_{OUT}*\text{COS(ALPHA+40°)} \quad \text{Eq. 3}$$

$$V_5=V_{OUT}*\text{SIN(ALPHA+40°)}-V_0+V_1)*\text{SIN}(30°) \quad \text{Eq. 4}$$

$$V_3*\text{COS}(30°)=V_{IN}-V_{OUT}*\text{COS(40°-ALPHA)} \quad \text{Eq. 5}$$

$$V_4=V_{OUT}*\text{SIN(40°-ALPHA)}-V_3*\text{SIN}(30°) \quad \text{Eq. 6}$$

$$V_2=2*V_{IN}*\text{COS}(30°)-V_0-V_1-V_3 \quad \text{Eq. 7}$$

Therefore, for any choice of input line-to-neutral voltage and phase angle 52 (ALPHA), all the winding voltages may be determined.

A computer may be utilized to evaluate all values of phase angle 52 (ALPHA) that produce acceptable values of Vout from equation 1. Equation 2–Equation 7 may be solved for each value of the phase angle 52 to obtain corresponding values of $V_0$–$V_5$. Finally, a pre-selected range of integers are searched to determine if any provide an acceptable approximation to the voltages.

The results of such a computer study are shown in Table 1 for up to 18 turns for serial windings 22a, 24a, 26a. The column headed ERROR shows the sum of the squares of the ratio error for all serial windings and stub windings 22a–f, 24a–f, 26a–f within each respective coil 16, 18, 20. It becomes progressively easier to find suitable integers as the number of turns in each of the serial windings 22a, 24a, 26a increases. Table 1 shows that suitable solutions exist for relatively small numbers of turns within the serial windings 22a, 24a, 26a.

TABLE 1

| 22a | 22b | 22c | 22d | 22e | 22f | VIN/VOUT | AL-PHA° | ERROR |
|---|---|---|---|---|---|---|---|---|
| 3 | 6 | 20 | 7 | 8 | 7 | 1.1400 | 4.7500 | 0.014215 |
| 4 | 8 | 26 | 9 | 11 | 9 | 1.1429 | 4.8500 | 0.008388 |
| 5 | 9 | 29 | 10 | 12 | 10 | 1.1472 | 5.4000 | 0.003789 |
| 6 | 11 | 37 | 13 | 15 | 13 | 1.1500 | 5.1000 | 0.005460 |
| 7 | 13 | 43 | 15 | 18 | 15 | 1.1500 | 5.1000 | 0.002787 |
| 8 | 15 | 49 | 17 | 20 | 17 | 1.1514 | S.1500 | 0.000449 |
| 10 | 19 | 63 | 22 | 26 | 22 | 1.1472 | 5.0000 | 0.001103 |
| 11 | 20 | 66 | 23 | 27 | 23 | 1.1543 | 5.2500 | 0.001509 |
| 12 | 22 | 70 | 25 | 29 | 24 | 1.1571 | 5.3500 | 0.001667 |
| 13 | 24 | 78 | 27 | 32 | 27 | 1.1543 | 5.2500 | 0.000875 |
| 14 | 25 | 82 | 29 | 34 | 28 | 1.1571 | 5.3500 | 0.001396 |
| 15 | 27 | 88 | 31 | 36 | 30 | 1.1571 | 5.3500 | 0.000461 |
| 16 | 30 | 98 | 34 | 40 | 24 | 1.1514 | 5.1500 | 0.000449 |
| 17 | 31 | 100 | 35 | 51 | 34 | 1.1571 | 5.3500 | 0.000820 |
| 18 | 33 | 108 | 38 | 44 | 37 | 1.1943 | 5.2500 | 0.000780 |

While preferred embodiments of the invention have been shown and described herein, it will be appreciated by those skilled in the art that various modifications and alternatives to the disclosed embodiments may be developed in light of the overall teachings of the disclosure. Accordingly, the disclosed embodiments are meant to be illustrative only and not limiting to the scope of the invention which is to be given the full breadth of the following claims and all equivalents thereof.

What is claimed is:

1. An autotransformer for converting three-phase AC power to nine-phase AC power, comprising:
   a. three coils each having a plurality of serial windings and a plurality of stub windings;
   b. said serial windings forming a delta;
   c. said stub windings each being magnetically coupled with corresponding ones of said serial windings and each being electrically connected at a first end thereof with other respective ones of said serial windings;
   d. three terminals connected to respective apices of said delta for connecting to a three-phase AC source;
   e. a plurality of direct outputs each being directly tapped into one of said coils intermediate respective ones of said serial windings within said coil; and
   f. a plurality of indirect outputs each being electrically connected with a second end of a respective one of said stub windings.

2. The autotransformer of claim 1 wherein the voltage of said indirect outputs is one of generally 35° and generally 45° out of phase with the voltage at a corresponding one of said apex terminals.

3. The autotransformer of claim 1 wherein the voltage magnitude of each of said direct outputs is equal to the voltage magnitude of each of said indirect outputs.

4. The autotransformer of claim 1 wherein the voltage of each of said direct outputs is out of phase with the voltage of a corresponding one of said apex terminals by a given phase angle.

5. The autotransformer of claim 4 wherein the given phase angle is generally 5°.

6. The autotransformer of claim 1 wherein said apex terminals are adapted to be connected directly to the AC power source.

7. The autotransformer of claim 1 wherein each of said stub windings is magnetically coupled with corresponding ones of said serial windings having the same phase.

8. An autotransformer for converting three-phase AC power to nine-phase AC power, comprising:
   a. three coils each having a plurality of serial windings and a plurality of stub windings;
   b. said serial windings forming a delta;
   c. said stub windings each being magnetically coupled with corresponding ones of said serial windings and each being electrically connected at a first end thereof with other respective ones of said serial windings;
   d. three terminals connected to respective apices of said delta for connecting to a three-phase AC source;
   e. a plurality of direct outputs each being directly tapped into one of said coils intermediate respective ones of said serial windings within said coil;
   f. a plurality of indirect outputs each electrically connected with a second end of a respective one of said stub windings; and
   g. wherein the voltage of each of said direct outputs is generally 5° out of phase with the voltage of a corresponding one of said apex terminals and the voltage of each of said indirect outputs is one of generally 35° and generally 45° out of phase with the voltage of a corresponding one of said apex terminals.

9. The autotransformer of claim 8 wherein the voltage magnitude of each of said direct outputs is equal to the voltage magnitude of each of said indirect outputs.

10. The autotransformer of claim 8 wherein said apex terminals are adapted to be connected directly to the AC power source.

11. The autotransformer of claim 8 wherein each of said stub windings is magnetically coupled with corresponding ones of said serial windings having the same phase.

12. The autotransformer of claim 8 wherein the voltage magnitude of each of said direct outputs is equal to the voltage magnitude of each of said indirect outputs and each of said stub windings is magnetically coupled with corresponding ones of said serial windings having the same phase and said apex terminals are adapted to be directly connected to the AC power source.

* * * * *

UNITED STATES PATENT AND TRADEMARK OFFICE
CERTIFICATE OF CORRECTION

PATENT NO. : 5,619,407
DATED : April 8, 1997
INVENTOR(S) : Peter Hammond

It is certified that error appears in the above-indentified patent and that said Letters Patent is hereby corrected as shown below:

Column 6, Table 1, under the heading "22f", 13th line down, change "24" to --34--.

Column 6, Table 1, under the heading "VIN/VOUT", 15th line down, change "1.1943" to --1.1543--.

Signed and Sealed this

Sixteenth Day of September, 1997

Attest:

BRUCE LEHMAN

Attesting Officer

Commissioner of Patents and Trademarks